United States Patent
Lunev

(10) Patent No.: US 9,430,265 B1
(45) Date of Patent: *Aug. 30, 2016

(54) SYSTEM AND METHOD FOR HANDLING I/O TIMEOUT DEADLINES IN VIRTUALIZED SYSTEMS

(71) Applicant: Parallels IP Holdings GmbH, Schaffhausen (CH)

(72) Inventor: Denis Lunev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,394

(22) Filed: Jul. 30, 2015

Related U.S. Application Data

(63) Continuation of application No. 13/756,181, filed on Jan. 31, 2013, now Pat. No. 9,122,505.

(51) Int. Cl.
 *G06F 9/455* (2006.01)
 *G06F 15/173* (2006.01)
 *H04L 29/08* (2006.01)

(52) U.S. Cl.
 CPC ....... *G06F 9/45545* (2013.01); *G06F 9/45558* (2013.01); *G06F 2009/45579* (2013.01); *H04L 29/08072* (2013.01); *H04L 29/08144* (2013.01)

(58) Field of Classification Search
 None
 See application file for complete search history.

(56) References Cited

U.S. PATENT DOCUMENTS

| | | | |
|---|---|---|---|
| 6,079,025 A | 6/2000 | Fung | |
| 7,328,437 B2 | 2/2008 | Donovan et al. | |
| 7,594,234 B1 | 9/2009 | Dice | |
| 8,230,203 B2 | 7/2012 | Neiger et al. | |
| 2005/0081204 A1 | 4/2005 | Schopp | |
| 2007/0033589 A1 | 2/2007 | Nicholas et al. | |
| 2011/0314470 A1 | 12/2011 | Elyashev et al. | |

OTHER PUBLICATIONS

Boguslavsky, et al., "Optimal Strategies for Spinning and Blocking." Jan. 1993, Computer Systems Research Institute, University of Toronto, Canada.

*Primary Examiner* — Tammy Lee
*Assistant Examiner* — Michael Ayers
(74) *Attorney, Agent, or Firm* — Bardmesser Law Group

(57) ABSTRACT

Method for avoiding Guest I/O timeout, including generating a request to an I/O device in a Guest Operating System (GOS) running inside a VM; setting a VM timeout deadline; in a hypervisor, setting a supervisory timeout deadline for the I/O device to respond that is shorter than the VM timeout deadline; if no response is received before expiration of the supervisory timeout deadline, pausing the GOS; freezing system time of the GOS; activating a handler for the I/O device response in the hypervisor; upon receipt of the response prior to the supervisory timeout deadline, forwarding the response to the GOS, unpausing the GOS, unfreezing the system time of the GOS; upon receipt of the response after the supervisory timeout deadline, and after the GOS is unpaused by the hypervisor, the Guest OS receives the response from the hardware device; and if no response is received, the GOS is kept paused.

11 Claims, 8 Drawing Sheets

SYSTEM AND METHOD FOR HANDLING I/O TIMEOUT DEADLINES IN VIRTUALIZED SYSTEMS

BACKGROUND OF THE INVENTION

1. Field of the Invention

The present invention is related to Virtual Machines, and more particularly, to handling guest I/O device timeouts generated in the host OS.

2. Description of the Related Art

A Virtual Machine (VM) is a type of an isolated Virtual Environment where multiple VMs can run on the same physical machine simultaneously. Each VM instance has a set of its own software components (including OS) and uses hardware modules of the physical machine where the VM resides.

Often, there are multiple VMs running on a host operating system. In such system, some resources of the host operating system are isolated and allocated for running each of the VMs. With Virtual Machine (VM) technology, a user can create and run multiple virtual environments on a server at the same time. Each virtual environment, such as a VM, requires its own Guest Operating System (GOS) and can run applications independently.

One common problem that many modern Virtual Machines face is that the guest operating system frequently makes requests to its own virtual hardware devices (which are, in fact, emulated by the VMM or hypervisor), and waits for response from the device. Examples of devices that utilize such access requests are disk drives, DVD drives, CD ROM drives, some network access devices, and so on. Any operating system (whether virtualized or not) sets a timeout period for the device to respond, which is typically on the order of about 5 seconds for network devices, 10 seconds for hard drives, 30 seconds for DVD, and so on. As far as the guest OS is concerned, the timeout is the same as if real hardware were involved, since the guest OS does not realize that it is a guest, and believes that it is working with real hardware.

If the virtual device does not respond within the timeout period, the operating system will typically make one more request to the device, in some cases two more requests, normally with the same timeout period. If the device, such as the disk drive, has not responded in that time, the guest OS normally enters some sort of a fail mode—as far as it is concerned, its file system is inaccessible, or is treated as read only, and the only way to recover the Virtual Machine is to restart the machine from scratch or from some previous state, once the hardware device in question is back on line. Note that although the guest OS makes the assumption that the device has failed, this is not necessarily the case when virtualized systems are involved—for example, the device might be in use by other Virtual Machines or by the host OS, or the device might be a network storage device, i.e., the physical device is actually located remotely, and may be temporarily inaccessible due to network connection issues, network protocol issues, and so on.

The upshot of all this is that the inaccessibility of the device is temporary, while the guest OS running inside the Virtual Machine assumes (like any operating system would assume in this case) that the failure to respond is permanent, and will therefore return an error and/or crash. Note that this applies to guest OS's with dynamic translation, and with hardware support for virtualization (where the problem "commands" from the guest are intercepted by the hypervisor, and replaced with safe commands). Examples of such virtualized operating systems are available from VMware, z/VM, etc. Examples of full virtualization of MICROSOFT Windows may be found in the VMWARE ESX server, MICROSOFT Virtual PC, Parallels Desktop and so on.

The same problem also affects paravirtualization schemes, where the guest OS kernel is only modified in a relatively minor manner, and given the ability to access real hardware, and where the hypervisor provides the host OS with a guest API. Even though paravirtualized device drivers are aware of the existence of the host OS and of the existence of time lags when accessing devices (and therefore do not always post timeouts). The setting of a timeout is a way to determine that the physical hardware device is unavailable or is turned off, however, in this case paravirtualization software can ask the host OS directly to determine the reason for the device not responding, and make a decision about what the guest OS should do—re-send the request to the device, or shut down the guest OS. Examples of paravirtualization systems using LINUX are XEN and UML (User-mode LINUX). KVM is an example of a Windows paravirtualization scheme.

Once the guest OS "hangs", the only way to reanimate it is to reload it from scratch. Such OS "hangs" happens usually if there are problems with the HDD, while problems with network devices may cause less extreme OS behavior. The 10 second timeout period (for hard drive, for example) is justified if the operating system in question is the host OS, installed on a host machine, where the host OS addresses the devices using its own native drivers. On the other hand, if the request to access a device actually comes from a guest OS, then the standard timeout periods are frequently insufficient, since there are many intermediate processes involved, before the request finally reaches the device and is returned back with some value or data. This is a particular problem in the context of network file systems and network-based storage devices, where the time lags are even greater.

Accordingly, there is a need in the art for a mechanism to handle device I/O timeouts for Virtual Machines that addresses the uncertainty in device response time due to virtualization issues.

SUMMARY OF THE INVENTION

Accordingly, the present invention is directed to a method for handling I/O timeouts in a virtualized system that substantially obviates one or more of the problems in the related art.

An exemplary embodiment provides a method for avoiding Guest I/O timeout, including generating a request to an I/O device in a Guest Operating System (OS) running inside a Virtual Machine (VM); setting a VM timeout deadline; in a hypervisor that manages the VM, setting a supervisory timeout deadline for the I/O device to respond, wherein the supervisory timeout deadline is shorter than the VM timeout deadline; if a response from the I/O device is not received prior to expiration of the supervisory timeout deadline, pausing the Guest OS; freezing system time of the Guest OS; activating a handler for the I/O device response in the hypervisor, to process the response from the I/O device; upon receipt of the response prior to the supervisory timeout deadline, forwarding the response to the Guest OS, unpausing the Guest OS and unfreezing the system time of the Guest OS; upon receipt of the response after the supervisory timeout deadline, and after the Guest OS is unpaused by the hypervisor, the Guest OS is able to receive the response from the hardware device and delete the VM timeout deadline; and if no response is received from the I/O device, the guest OS is kept in a paused state.

Optionally, the I/O device is a hard disk drive, or a network storage device, or a flash drive, or a magnetic tape, a CD ROM drive or a DVD drive. Optionally, the I/O device is any hardware device for which the Guest OS has a driver. Optionally, the pausing of the Guest OS includes halting all processes running on a virtual CPU associated with the VM. Optionally, the method compensates for time lags in a time frame of the Guest OS relative to a time frame of a host OS. Optionally, the time frame of the Guest OS is nonlinearly related to the time frame of the host OS.

In another embodiment, a method for avoiding multiple Guest I/O timeouts includes generating a request to an I/O device in a Guest Operating System (OS) running inside a Virtual Machine (VM); setting a VM timeout deadline; in a hypervisor that manages the VM, setting a supervisory timeout deadline for the I/O device to respond, wherein the supervisory timeout deadline is shorter than the VM timeout deadline; pausing the Guest OS and freezing a system time of the guest OS; receiving additional requests to the I/O device prior to expiration of the supervisory timeout deadline; in the hypervisor, setting supervisory timeout deadlines for the additional requests, and writing all the supervisory timeout deadlines into a deadline structure; if a response from the I/O device is received prior to expiration of the supervisory timeout deadline, forwarding the response to the Guest OS, unpausing the Guest OS, unfreezing the system time of the Guest OS and deleting the corresponding supervisory timeout deadline from the deadline structure; if a response from the I/O device is not received prior to expiration of the supervisory timeout deadline, pausing the Guest OS; freezing system time of the Guest OS; activating a handler for the I/O device response in the hypervisor, to process the response from the I/O device; upon receipt of the response after the supervisory timeout deadline, checking if other timeout deadlines are pending in the deadline structure; if other expired timeout deadlines are pending in the deadline structure, selecting the next closest timeout deadline without unpausing the Guest OS; if only unexpired timeout deadlines are pending in the deadline structure, selecting the next closest timeout deadline and unpausing the Guest OS; if no other timeout deadlines are pending in the deadline structure, unpausing the Guest OS; and if no response is received from the I/O device, the guest OS is kept in a paused state.

The structure to store deadlines (deadline structure) may be the simple list, ordered list, and the hierarchical tree and other appropriate structure for recording, storage and quick retrieval. Optionally, the hypervisor handles I/O responses during the Guest OS pause with longer deadlines if the response has been received while the Guest OS is paused, and deletes those deadlines from the deadline structure.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

DEFINITIONS

I/O—the operation of sending data or receiving data from an external device or a peripheral device, connected to a computer.

Hypervisor—a computer program or layer, that works on the highest privilege level of the computer, and in some cases assuming the functions of the host OS, and which permits launching Virtual Machines and guest OS's within the Virtual Machines. The hypervisor enables isolation of the guest OS's from each other, a resource separation between the Virtual Machine and the host, and management of those physical resources.

RB-tree (red-black-tree) next one of the self-balancing variations of binary search trees, which guarantees a logarithmic growth of tree height as a function of the number of nodes, and which permits a rapid execution of the most common tree operations: addition, deletion, and searching for a node. The balancing is achieved based on the addition of an attribute to each node-color. This attribute can take on two possible values—black and red.

Pause (or freeze)—the temporary halting of all processes of a virtual CPU of the guest OS, which freezes the state of the guest OS. All the processes and threads of the guest OS are removed from the physical CPU scheduler, which means that the guest OS, when paused, does not have access to physical resources of the host.

The proposed approach relies on the hypervisor to put the guest OS in a paused state, and restore its functioning after the pause. Here, it is important to note that there is no requirement for the operator or user to respond to this event. In MICROSOFT WINDOWS, such a pause regime is referred to as "sleep" or "sleep regime." However, in the case of MICROSOFT WINDOWS, the operating itself processes the event, and places the event in the interrupt handler so that it can wake the operating system (pressing on a key on the keyboard, or moving a mouse are examples of such an event), whereas in the virtualized case, the hypervisor processes these events, and receives information about these events itself. See, for example, U.S. Pat. No. 7,506,096, incorporated by reference herein in its entirety.

Figure 4:
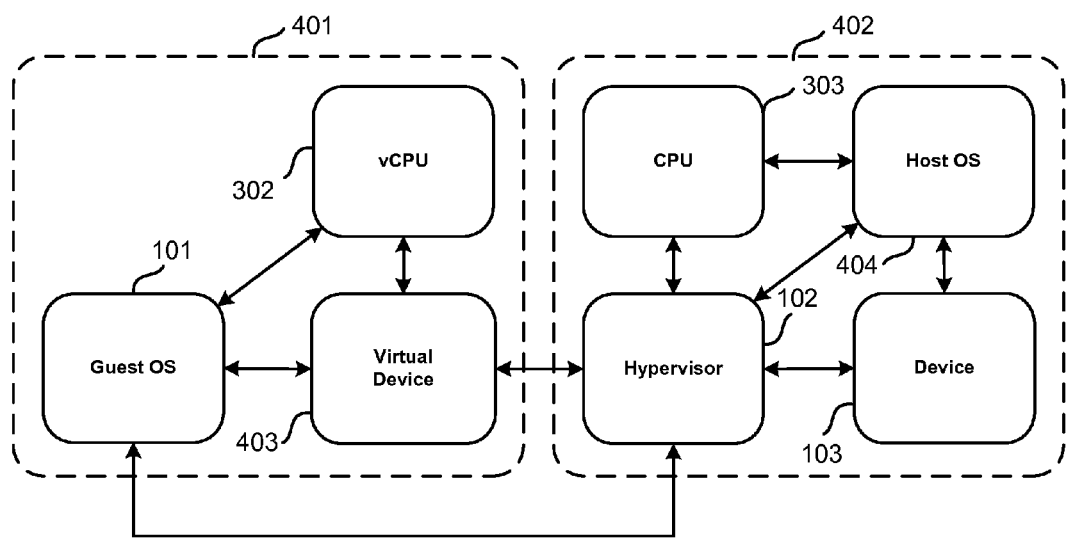
FIG. 4 shows how the various components interact in a case of a single I/O request.

A single I/O request embodiment is illustrated in FIG. 4, which shows how the various components interact. Here, at a moment when the guest OS 101 has sent the first request to the virtual device 403, the hypervisor 102 begins its activity to analyze the request made according to its type and to define how long the timeout period is, from the perspective of the guest OS 101. Then, the hypervisor sets its own timeout for the request, which can be somewhat less of a duration, according to the guest OS 101. The shorter time is necessary to insure that the guest OS will not "hang" after reaching the timeout deadline.

Next, if the response from the device 103 is received before the timeout set by the hypervisor 102 expires, then the hypervisor 102 sets the interrupt, and transfers control to the interrupt handler, which removes the hypervisor 102 timeout. After that, the hypervisor 102 returns control back to the guest OS. The guest OS 101 receives the response from the virtual device 403, since the virtual CPU threads are now active, and removes its own timeout deadline.

If the response from the device 103 has not been received before the hypervisor 102's timeout deadline, then the hypervisor 102 freezes the guest OS 101, thereby preventing the guest OS 101 from reaching the timeout deadline. The guest OS 101 clock is also stopped at that moment.

The hypervisor 102 also initiates the time compensation system, which tracks the changes and the frequency of the signals received by the timer that are addressed to the guest OS 101. The time compensation system is used to equalize the Guest and Host time, see FIG. 3, discussed below.

Figure 3:
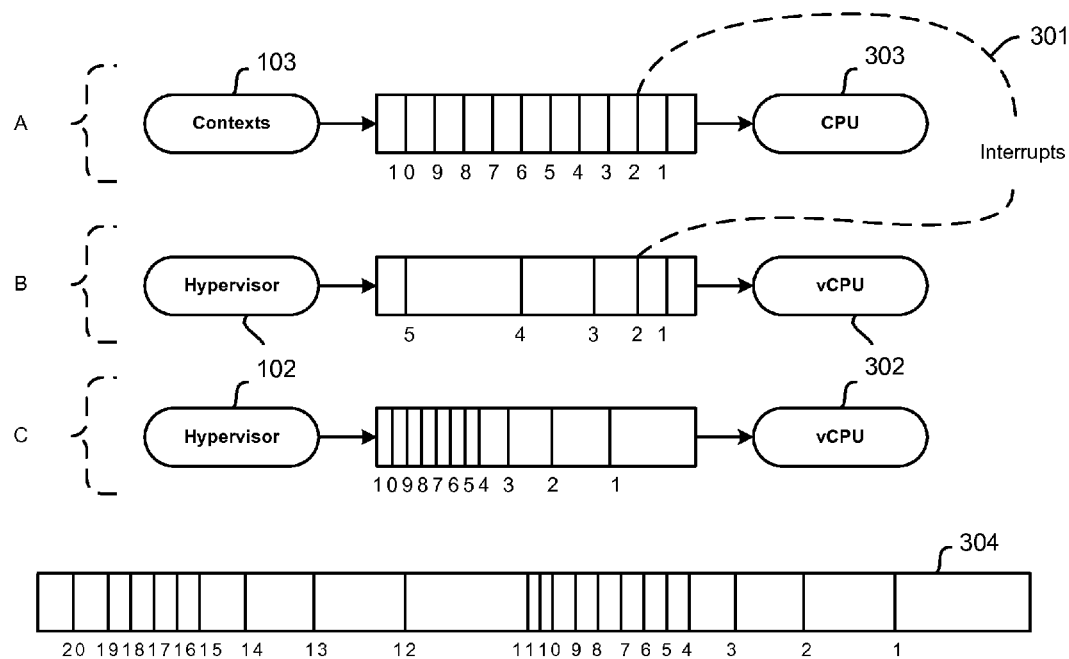
FIG. 3 illustrates a time compensation system.

The time compensation system is turned on only when, due to a previous freeze or pause, the guest OS started lagging behind. When the time signals from the virtual CPU 302 of the Virtual Machine 401 are received with ever decreasing frequency (in other words, the time in the guest OS 101 is slowed down, compared to the host OS 404 time), the time compensation system compensates for the time lag by increasing the frequency of the following signals, as shown in FIG. 3, scenario C.

When the response from the device 103 is received, the hypervisor 102 returns the guest OS 101 into its normal working regime. All virtual CPUs are un-paused, and continue executing guest code. In this regime, the guest OS 101 is capable of receiving the response from the device 103, and the problem of the guest OS crashing is no longer at issue, since a response from the device 103 is guaranteed to be received. There is a non-zero probability that the response from the device 103 will never arrive—in that case, the state of the guest OS will not change. Note that the proposed is mostly applicable to situations resulting from slow virtualization processes, but it obviously cannot cure actual failure of the physical host hardware.

The above is a general description of the proposed algorithm for handling I/O device timeouts, given the condition that while waiting for the timeout, there have been no other I/O request.

In practice, the deadline is kept track for each request, and each request has its own deadline. The time counting is done in the guest OS time frame. When the request is executed (the data from the host 402 has been received), this request is removed from the request data structure, and a new deadline for the guest 401 is calculated, based on the outstanding, but not yet executed, request.

As another possibility, multiple I/O requests might be received, and the algorithm takes into account the possibility of receiving new I/O requests, after the timeout deadline has been set, and prior to the end of the timeout.

If, when once the timeout deadline is set, and before its expiration, new I/O requests are received, then the closest deadline will always be set. All deadlines are sorted and organized as a structure, which can be a list, an ordered list, a hierarchical tree, or another suitable structure. An RB-tree is believed to be the optimal structure for most cases.

If the response from the host is received before the deadline expires, then the next closest deadline is selected, assuming the structure has the next closest deadline, otherwise, the deadline is mechanism is turned off. When the guest OS is working, and even when the guest OS is frozen, it is possible to complete other I/O requests, with later deadlines, if the response is from the host to those requests had been received. In that case, they are deleted from the structure. Once the monitored (first) deadline is deleted from structure, the next closest deadline is selected, if there were other I/O requests.

Pausing or freezing the guest OS causes a potential problem—inside the guest OS there is software that waits for timer-based interrupts, i.e., signals to the virtual CPU, generated by the timer. Without the signals, the normal functioning of the guest OS is at risk. During a pause, if nothing happens, the timer interrupts will not reach their recipient. Therefore, the hypervisor needs to insert them into the guest OS, but not in the same timeframe as the actual timer-based interrupts, but with lesser time gaps between them.

Figure 8:
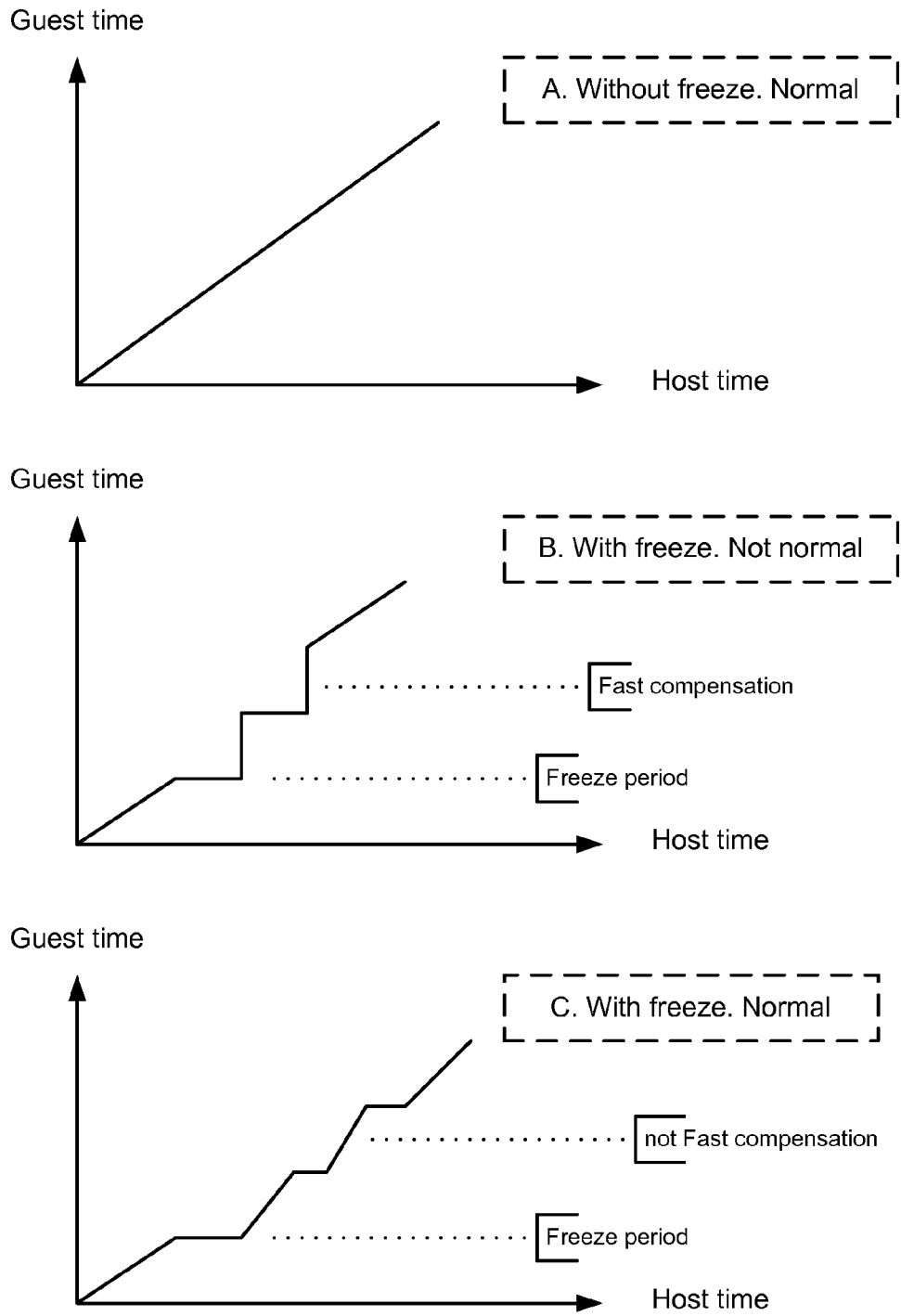
FIG. 8 illustrates desired performance of the time compensation system.

When the Guest OS is unfrozen, it needs to compensate for the missed time. Once the guest OS is unpaused, a system for time addition is turned on, which permits managing the timer-based interrupts using a more balanced scheme to avoid a too fast compensation of time. Doing it too quickly it is bad for Guest OS because it might not have time to react to all the proper events upon unfreezing. The period of capture the time needs to be increased, as seen in FIG. 8 When a VM functions, there are two separate time frames—the guest time frame and the host time frame. Since they are different, all manipulations relating to time, in this context, needs to be done in the guest time frame, rather than the host time frame, to avoid the problem of I/O timeouts. Therefore, all manipulations with system time are done in the guest/VM, in the embodiments described herein. The system of time compensation permits making up the time of the guest, which went out of sync while the guest was "freezing".

Figure 1:
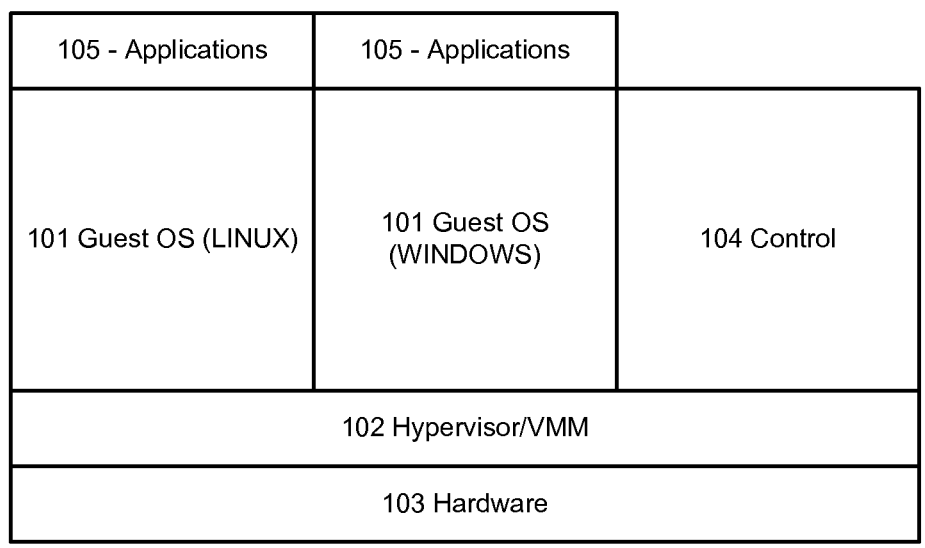
FIG. 1 illustrates a generalized virtualization system architecture.

FIG. 1 illustrates a general virtualization architecture, according to the present invention. As shown in FIG. 1, on the computer hardware 103, a hypervisor or Virtual Machine monitor (VMM) 102 is running, and directly controls the physical resources of the computer. The hypervisor also manages the guest OS's. Control program 104 (a user-space portion of the hypervisor) distributes computational resources between the operating systems, and isolates them from each other. Guest OS 101 can be launched on the computer, in one or more instances, and the guest OS's can be the same version of the OS, different versions of the same OS, or different operating systems entirely. In the case of paravirtualization, the guest OS needs to be modified. The kernel of Guest OS needs modifications that makes it aware of the concept of virtual environment. It is a set of beancounters (a set of per-container counters, limits, and guarantees) and namespace (an abstract environment created to hold a logical grouping of unique identifiers or symbols). An example of paravitrualization is OpenVZ containers. Guest applications 105 are launched within the Virtual Machines, running under the guest OS's.

Figure 2:
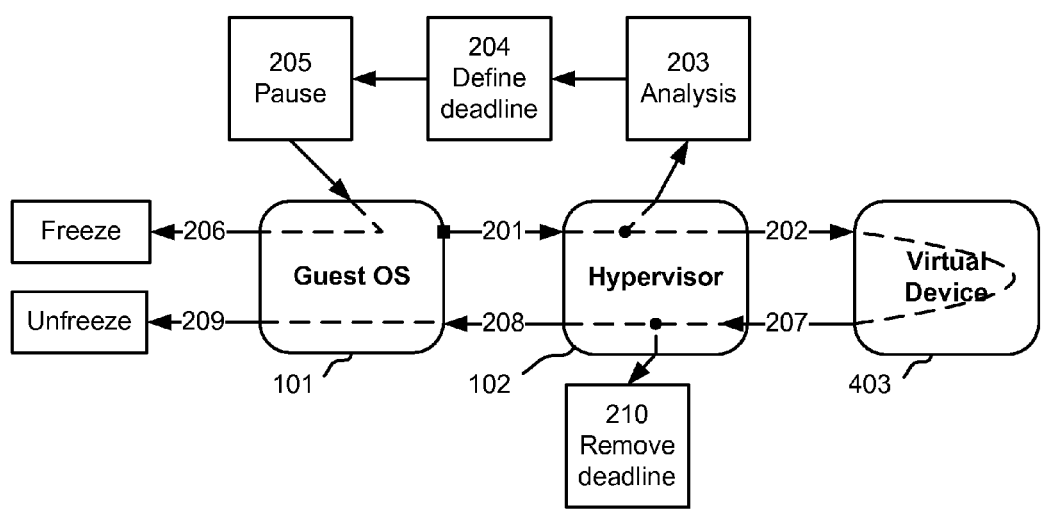
FIG. 2 illustrates an algorithm for handling I/O request timeouts.

FIG. 2 illustrates the algorithm for I/O timeout avoiding, according to one embodiment of the present invention. As shown in FIG. 2, in step 201, the guest OS sends a request to the virtual device 403. In step 202, the hypervisor intercepts the request, and retransmits it to the device 403. In step 203, the hypervisor analyzes the request and estimates the time that the guest OS expects the execution of the request will take. In step 204, based on the results of the analysis, the hypervisor 102 sets its own I/O timeout deadline, which is less than the timeout deadline of the guest OS. In step 205, the hypervisor 102 pauses the guest OS 101. In step 206, the guest OS goes to freeze. In step 207, the device 403 responds to the request. In step 208, the hypervisor 102 wakes up the guest OS 101, and retransmits the response to the guest OS. In step 209, the guest OS 101 "unfreeze", receives the response from the device 403, and remains in a working state. In step 210, the hypervisor deletes its own deadline.

FIG. 3 illustrates the time compensation system, according to one embodiment of the invention. As shown in FIG. 3, in scenario A, timer interrupts 301 from the various context (i.e., from the various devices and applications) 103 are sent to the processor 303 on the host. In this example, there are 10 interrupts, which occur in the time t, with equal intervals, t1=t2= . . . t=t10=T÷10.

In scenario B, the signals from the various context are sent to the Virtual Machines through the hypervisor, which, self evidently, causes additional delays. Timer interrupts 301, sent by the hypervisor 102 to the virtual processor 302 are sent when the timer compensation system is off. Longer and uneven pauses between the signals 301 are caused by various system glitches, when system time is stopped, and the overall number of interrupt signals during the chosen period is less than in the case of scenario A, above.

In scenario C, the time compensation system is turned on. Timer-based interrupts 301, sent by the hypervisor 102 to the virtual processor 302, now use a turned on a time compensation system. In the same period T, the same 10 interrupts occur, but with different intervals between them. From t5 to t10, time is being compensated, and the intervals between these interrupts are shortened, in order to compensate for the lag in the signals t1-t3.

If a longer period of time than T is assumed, this corresponds to element 304 in FIG. 3.

FIG. 4 illustrates the relationship between the various system components involved in the present invention. As shown in FIG. 4, a host 402 includes a CPU 303 with a host OS 404 running on it. Real hardware devices 103 are responding to a request from the various system components, both real and virtual. A Virtual Machine 401 has a guest OS 101 that runs on a virtual CPU 302 and virtual devices 403. A hypervisor 102 supervises the Virtual Machine 401.

Figure 5:
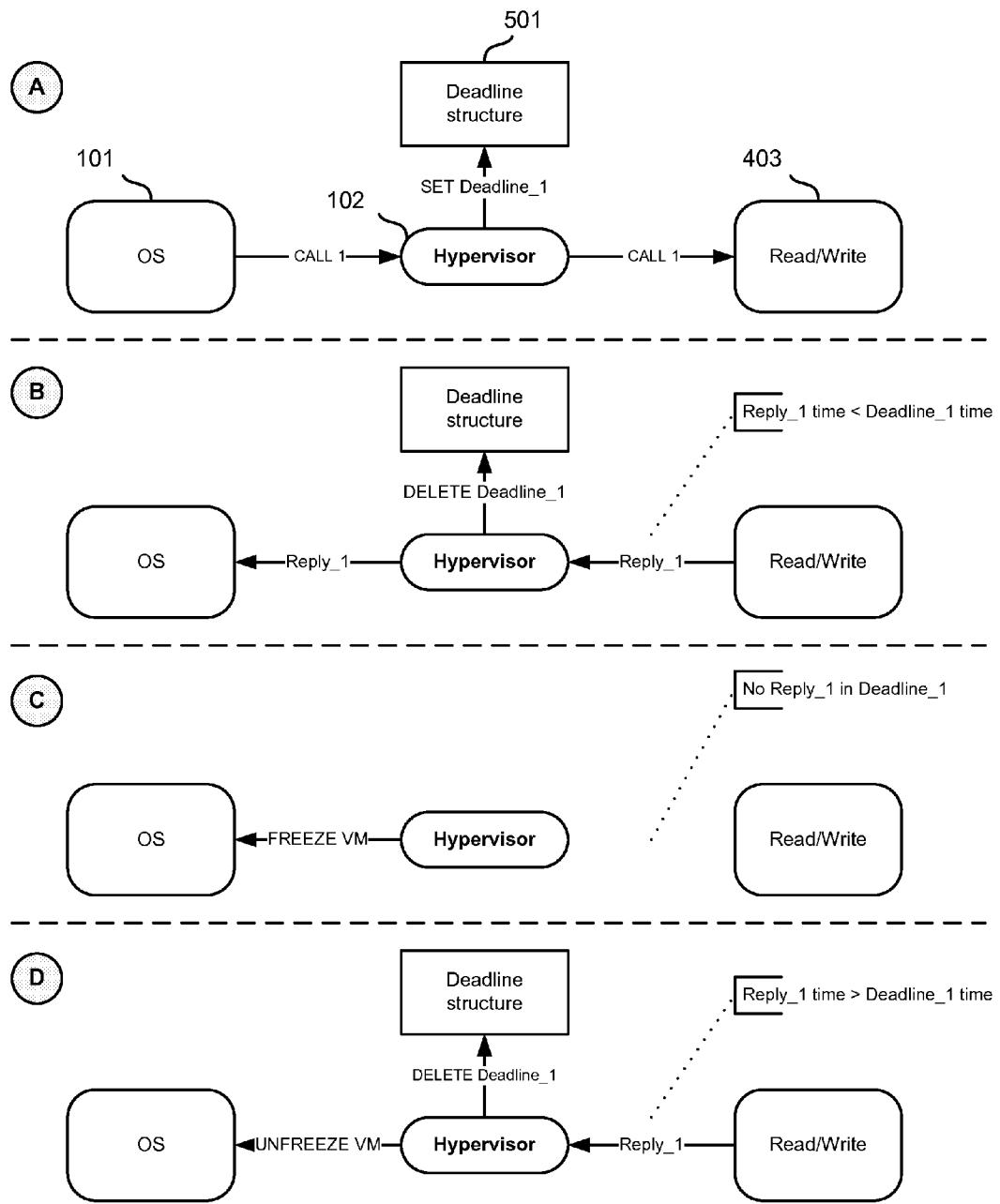
FIG. 5 illustrates various scenarios of how the hypervisor works with deadlines with a single I/O request.

FIG. 5 illustrates various scenarios of how the hypervisor works with deadlines with a single I/O request. In scenario A, the guest 101 sends a request to the virtual device 403 (through a virtual driver—not shown in FIG. 5). The hypervisor 102 intercepts the request, and in its Deadline structure sets deadline 1. The request is then forwarded to the device 103. In scenario B, a response 1 is received to request 1, from device 403, and is received before the deadline 1 has expired. The hypervisor 102 deletes deadline 1 from the Deadline structure 501, and the response is forwarded to the guest OS 101. In scenario C, device 403 does not send a timely response to request 1 prior to expiration of deadline 1, and the hypervisor 102 freezes the guest OS 101. In scenario D, device 403 sends a response 1 to request 1 after the deadline 1 time has expired. The hypervisor 102 deletes deadline 1 from the Deadline structure 501, and unfreezes/unpauses the guest OS 101.

Figure 6:
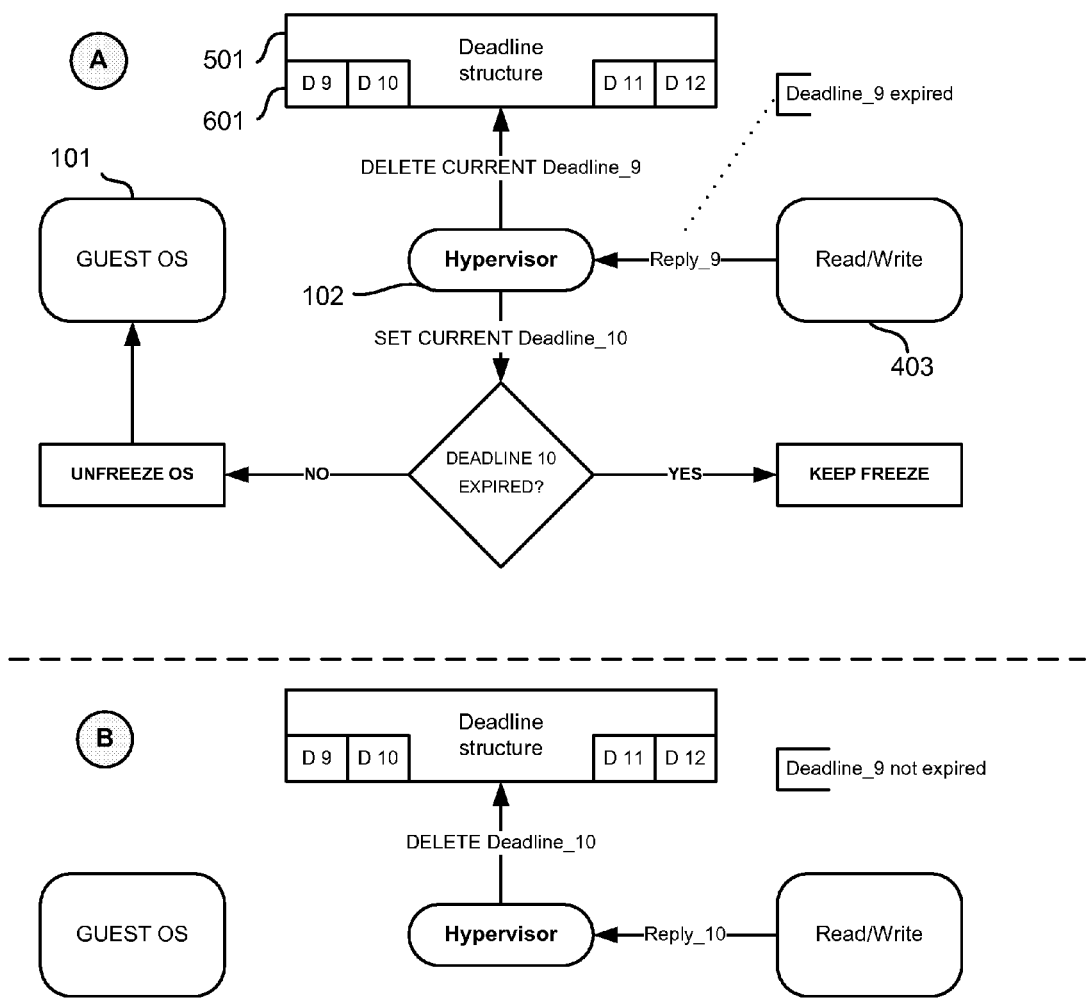
FIG. 6 illustrates different scenarios for how the hypervisor works with deadlines given multiple I/O requests.

FIG. 6 illustrates different scenarios for how the hypervisor works with deadlines given multiple I/O requests. As shown in FIG. 6, the Deadline structure 501 already has several deadlines in it, labeled as D9, D10, D11, D12, etc. and the current (i.e., the closest in time) in this case is deadline 9 also labeled as 601. In scenario A, the response 9 from device 403 is received (in response to request 9), later than the time of expiration of deadline D9. Thy hypervisor 102 deletes the deadline from the Deadline structure 501, and unfreezes the guest OS 101. The deadline D10, as the next closest deadline to D9, becomes the current deadline. The hypervisor 102 checks whether the time for deadline D10 has expired. If it has, then the hypervisor 102 again pauses the guest OS 101. Otherwise, the hypervisor passes the response to the guest OS 101, which remains in an unfrozen state.

In scenario B, a response 10 is received from device 403, in response to request 10, prior to the expiration of the deadline D10. At the same time, the Deadline structure 501 has still unexpired deadline D9, which would expire prior to the expiration of the deadline D10. In this case, the hypervisor 102 deletes the deadline D10.

Figure 7:
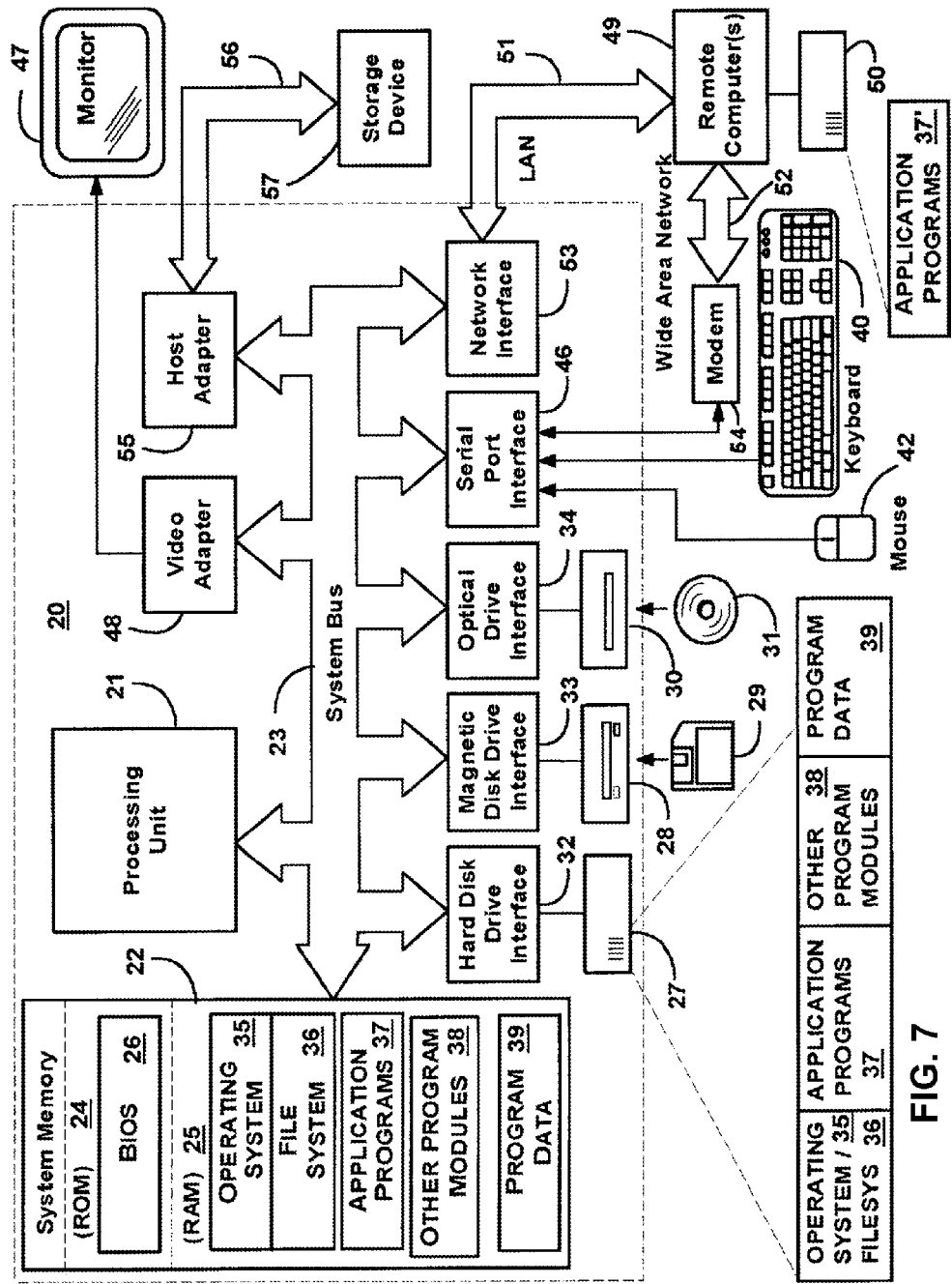
FIG. 7 illustrates a schematic of an exemplary remote or cloud computer system that can be used for implementation of the invention.

With reference to FIG. 7, an exemplary remote computer system for implementing the invention includes a general purpose computing device in the form of a computer 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for avoiding Guest I/O timeout, comprising:
   a. generating a request to an I/O device in a Guest Operating System (OS);
   b. setting a Virtual Machine (VM) timeout deadline to prevent a VM from failing if a response from the I/O device is not received;
   c. in a component that manages the VM, setting an I/O deadline for the I/O device to respond, wherein the I/O deadline is shorter than the VM timeout deadline;
   d. if a response from the I/O device is not received prior to expiration of the I/O deadline, pausing the Guest OS by halting all processes running on a virtual CPU associated with the VM;
   e. freezing a system time of the Guest OS;
   f. upon receipt of the response after the I/O deadline, forwarding the response to the Guest OS, unpausing the Guest OS and unfreezing the system time;
   g. upon receipt of the response by the Guest OS after the I/O deadline, and after the Guest OS is unpaused, the Guest OS is able to receive the response from the I/O device and delete the VM timeout deadline; and
   h. if no response is received from the I/O device, the Guest OS is kept in a paused state with the system time frozen.

2. The method of claim 1, wherein the I/O device is a hard disk drive.

3. The method of claim 1, wherein the I/O device is a network storage device.

4. The method of claim 1, wherein the I/O device is any of:
   a flash drive;
   a magnetic tape;
   a CD ROM drive; and
   a DVD drive.

5. The method of claim 1, wherein the I/O device is any hardware device for which the Guest OS has a driver.

6. The method of claim 1, further comprising compensating for time lags in a time frame of the Guest OS relative to a time frame of a host OS.

7. The method of claim 6, wherein the time frame of the Guest OS is nonlinearly related to the time frame of the host OS.

8. A method for avoiding multiple Guest I/O timeouts, comprising:
   a. generating a request to an I/O device in a Guest Operating System (OS);
   b. setting a VM timeout deadline to prevent a Virtual Machine (VM) from failing if a response from the I/O device is not received;
   c. in a component that has a higher privilege level than the VM, setting an I/O deadline for the I/O device to respond, wherein the I/O deadline is shorter than the VM timeout deadline;
   d. receiving additional requests to the I/O device prior to expiration of the I/O deadline;
   e. setting I/O deadlines for the additional requests, and writing all the I/O deadlines into a deadline structure;
   f. if a response from the I/O device is received prior to expiration of the I/O deadline in c, forwarding the response to the Guest OS, and deleting the I/O deadline for the request to the I/O device corresponding to the received response, from the deadline structure;
   g. if a response from the I/O device is not received prior to expiration of the I/O deadline in c, pausing the Guest OS by halting all processes running on a virtual CPU associated with the VM;
   h. freezing a system time of the Guest OS;
   i. upon receipt of the response to the request after the I/O deadline, checking if other requests from the VM are pending in the deadline structure;
   j. if any pending requests remain in the deadline structure, keeping the Guest OS paused;
   k. if no other requests from the VM are pending in the deadline structure, unpausing the Guest OS and unfreezing the system time; and l. if no response is received from the I/O device, the Guest OS remains paused with the system time frozen.

9. The method of claim 8, wherein the deadline structure is any of:
   a simple list;
   an ordered list; and
   a hierarchical tree and other structure for recording, storage and quick retrieval.

10. The method of claim 8, wherein the hypervisor handles I/O responses during the Guest OS pause with longer in duration VM timeout deadlines, if the response has been received while the Guest OS is paused, and deletes deadlines for completed requests from the deadline structure.

11. A computer program product comprising a non-transitory computer-readable storage medium storing code for performing the steps of claim 8.

* * * * *